(12) United States Patent
Mullen (10) Patent No.: US 12,373,820 B1
(45) Date of Patent: Jul. 29, 2025

(54) CARDS, DEVICES, SYSTEMS, AND METHODS FOR A FEATURED APPLICATION MANAGEMENT SYSTEM

(71) Applicant: Dynamics Inc., Cheswick, PA (US)

(72) Inventor: Jeffrey D. Mullen, Pittsburgh, PA (US)

(73) Assignee: Dynamics Inc., Cheswick, PA (US)

( * ) Notice: Subject to any disclaimer, the term of this patent is extended or adjusted under 35 U.S.C. 154(b) by 45 days.

(21) Appl. No.: 13/975,496

(22) Filed: Aug. 26, 2013

Related U.S. Application Data (60) Provisional application No. 61/693,729, filed on Aug. 27, 2012.

(51) Int. Cl.
*G06Q 20/10* (2012.01)
*G06Q 20/34* (2012.01)

(52) U.S. Cl.
CPC .................. *G06Q 20/351* (2013.01)

(58) Field of Classification Search
CPC ...................................... G06Q 30/00
USPC ......................................... 705/35
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

"The bank credit card business," American Banker's Association, 1996 246 pages attached, by David H. Buzzell (Year: 1996).*

(Continued)

*Primary Examiner* — Bruce I Ebersman
(74) *Attorney, Agent, or Firm* — Morris Law Group; Robert W. Morris (57) ABSTRACT

A user is provided with a GUI that may allow the user to change functionality associated with a non-powered card, a powered card or other device (e.g., a mobile telephonic device). The functionality associated with the device may be displayed by the GUI as a list of third-party applications that are currently featured third-party applications or as a list of third-party applications that have been previously featured applications.

20 Claims, 6 Drawing Sheets

(56) References Cited

U.S. PATENT DOCUMENTS

| | | | |
|---|---|---|---|
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A | 4/1997 | Lane | |
| 5,657,388 A | 8/1997 | Weiss | |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,129,274 A * | 10/2000 | Suzuki | G06Q 20/363 705/16 |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,199,052 B1 | 3/2001 | Mitty et al. | |
| 6,206,293 B1 | 3/2001 | Gutman et al. | |
| 6,213,392 B1 * | 4/2001 | Zuppicich | G06K 7/10297 235/375 |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski et al. | |
| 6,308,890 B1 | 10/2001 | Cooper | |
| 6,313,724 B1 | 11/2001 | Osterweil | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,422,462 B1 * | 7/2002 | Cohen | G07F 7/025 705/41 |
| 6,446,052 B1 | 9/2002 | Juels | |
| 6,460,141 B1 | 10/2002 | Olden | |
| 6,505,772 B1 * | 1/2003 | Mollett | G07F 7/1008 235/379 |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 * | 10/2003 | Blossom | G06K 19/07703 235/492 |
| 6,655,585 B2 | 12/2003 | Shinn | |
| 6,681,988 B2 | 1/2004 | Stack et al. | |
| 6,698,654 B1 * | 3/2004 | Zuppicich | G06K 7/0004 235/375 |
| 6,705,520 B1 | 3/2004 | Pitroda et al. | |
| 6,743,102 B1 * | 6/2004 | Fiechter | G07F 17/329 463/16 |
| 6,755,341 B1 | 6/2004 | Wong et al. | |
| 6,760,745 B1 * | 7/2004 | Tan | H04L 29/06 709/203 |
| 6,764,005 B2 | 7/2004 | Cooper | |
| 6,769,618 B1 | 8/2004 | Finkelstein | |
| 6,804,786 B1 * | 10/2004 | Chamley | G06Q 20/341 726/20 |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,873,974 B1 | 3/2005 | Schutzer | |
| 6,879,243 B1 * | 4/2005 | Booth | E05B 47/026 340/5.73 |
| 6,902,116 B2 | 6/2005 | Finkelstein | |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| 7,083,094 B2 | 8/2006 | Cooper | |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moullette et al. | |
| 7,136,514 B1 | 11/2006 | Wong | |
| 7,140,550 B2 | 11/2006 | Ramachandran | |
| 7,163,153 B2 | 1/2007 | Blossom | |
| 7,191,952 B2 * | 3/2007 | Blossom | G06K 19/06187 235/487 |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,246,752 B2 | 7/2007 | Brown | |
| 7,298,243 B2 | 11/2007 | Juels et al. | |
| 7,319,986 B2 * | 1/2008 | Praisner | G07F 7/1008 705/40 |
| 7,334,732 B2 | 2/2008 | Cooper | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Lin et al. | |
| 7,359,507 B2 | 4/2008 | Kaliski | |
| 7,360,688 B1 | 4/2008 | Harris | |
| 7,363,494 B2 | 4/2008 | Brainard et al. | |
| 7,380,710 B2 | 6/2008 | Brown | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |
| 7,523,301 B2 | 4/2009 | Nisbet et al. | |
| 7,530,495 B2 | 5/2009 | Cooper | |
| 7,532,104 B2 | 5/2009 | Juels | |
| 7,537,152 B2 * | 5/2009 | Chakiris | G06Q 20/3255 235/375 |
| 7,543,739 B2 | 6/2009 | Brown et al. | |
| 7,559,464 B2 | 7/2009 | Routhenstein | |
| 7,562,221 B2 | 7/2009 | Nystrom et al. | |
| 7,562,222 B2 | 7/2009 | Gasparini et al. | |
| 7,580,898 B2 | 8/2009 | Brown et al. | |
| 7,584,153 B2 | 9/2009 | Brown et al. | |
| 7,591,426 B2 | 9/2009 | Osterweil et al. | |
| 7,591,427 B2 | 9/2009 | Osterweil | |
| 7,602,904 B2 | 10/2009 | Juels et al. | |
| 7,631,804 B2 | 12/2009 | Brown | |
| 7,635,086 B2 * | 12/2009 | Spencer, II | G06Q 20/10 235/380 |
| 7,639,537 B2 | 12/2009 | Sepe et al. | |
| 7,641,124 B2 | 1/2010 | Brown et al. | |
| 7,660,902 B2 | 2/2010 | Graham et al. | |
| 7,784,687 B2 | 8/2010 | Mullen et al. | |
| 7,793,851 B2 | 9/2010 | Mullen | |
| 7,805,725 B2 * | 9/2010 | Schaftlein | G06F 9/50 717/169 |
| 7,828,207 B2 | 11/2010 | Cooper | |

(56) References Cited

U.S. PATENT DOCUMENTS

| | | |
|---|---|---|
| 7,828,220 B2 | 11/2010 | Mullen |
| 7,931,195 B2 | 4/2011 | Mullen |
| 7,946,917 B2 * | 5/2011 | Kaminkow ......... G07F 17/3248 |
| | | 463/43 |
| 7,954,705 B2 | 6/2011 | Mullen |
| D643,063 S | 8/2011 | Mullen et al. |
| 8,011,577 B2 | 9/2011 | Mullen et al. |
| 8,020,775 B2 | 9/2011 | Mullen et al. |
| 8,066,191 B1 | 11/2011 | Cloutier et al. |
| D651,237 S | 12/2011 | Mullen et al. |
| D651,238 S | 12/2011 | Mullen et al. |
| 8,074,877 B2 * | 12/2011 | Mullen ............ G06K 19/06206 |
| | | 235/380 |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| 8,172,148 B1 | 5/2012 | Cloutier et al. |
| D665,022 S | 8/2012 | Mullen et al. |
| D665,447 S | 8/2012 | Mullen et al. |
| D666,241 S | 8/2012 | Mullen et al. |
| 8,282,007 B1 | 10/2012 | Cloutier et al. |
| 8,286,876 B2 | 10/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| 8,302,872 B2 | 11/2012 | Mullen |
| D672,389 S | 12/2012 | Mullen et al. |
| 8,322,623 B1 | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| 8,348,172 B1 | 1/2013 | Cloutier et al. |
| D676,487 S | 2/2013 | Mullen et al. |
| D676,904 S | 2/2013 | Mullen et al. |
| 8,382,000 B2 | 2/2013 | Mullen et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| D687,094 S | 7/2013 | Mullen et al. |
| D687,095 S | 7/2013 | Mullen et al. |
| 8,485,437 B2 | 7/2013 | Mullen et al. |
| 8,485,446 B1 | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| D692,053 S | 10/2013 | Mullen et al. |
| 8,561,894 B1 | 10/2013 | Mullen et al. |
| 8,567,679 B1 | 10/2013 | Mullen et al. |
| D694,322 S | 11/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| D695,636 S | 12/2013 | Mullen et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,628,022 B1 | 1/2014 | Rhoades et al. |
| 8,635,086 B2 * | 1/2014 | Blom ..................... G06Q 50/22 |
| | | 705/2 |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,801,517 B2 * | 8/2014 | Walker ................ G07F 17/3206 |
| | | 463/16 |
| 8,814,050 B1 | 8/2014 | Mullen et al. |
| 8,818,868 B2 * | 8/2014 | Faires .................. G06Q 20/322 |
| | | 705/16 |
| 8,827,153 B1 | 9/2014 | Rhoades et al. |
| 8,875,999 B2 | 11/2014 | Mullen et al. |
| 8,881,989 B2 | 11/2014 | Mullen et al. |
| 8,888,009 B1 | 11/2014 | Mullen |
| 8,931,703 B1 | 1/2015 | Mullen et al. |
| 8,944,333 B1 | 2/2015 | Mullen et al. |
| 8,960,545 B1 | 2/2015 | Batra |
| 8,973,824 B2 | 3/2015 | Mullen et al. |
| 9,004,368 B2 | 4/2015 | Mullen et al. |
| 9,010,630 B2 | 4/2015 | Mullen et al. |
| D729,869 S | 5/2015 | Mullen et al. |
| D729,870 S | 5/2015 | Mullen et al. |
| D729,871 S | 5/2015 | Mullen et al. |
| D730,438 S | 5/2015 | Mullen et al. |
| D730,439 S | 5/2015 | Mullen et al. |
| 9,033,218 B1 | 5/2015 | Batra |
| 9,053,398 B1 | 6/2015 | Cloutier |
| 9,064,194 B1 | 6/2015 | Bohac, Jr. |
| 9,064,195 B2 | 6/2015 | Hartwick et al. |
| 9,064,225 B2 | 6/2015 | Mullen et al. |
| 9,064,255 B1 | 6/2015 | Mullen et al. |
| 9,153,088 B2 * | 10/2015 | Spencer, II ............. G06Q 50/34 |
| 9,292,843 B1 | 3/2016 | Mullen et al. |
| 9,306,666 B1 | 4/2016 | Zhang et al. |
| 9,329,619 B1 | 5/2016 | Cloutier |
| 9,349,089 B1 | 5/2016 | Rhoades et al. |
| 9,361,569 B2 | 6/2016 | Mullen et al. |
| 9,373,069 B2 | 6/2016 | Cloutier et al. |
| 9,384,438 B2 | 7/2016 | Mullen et al. |
| 9,547,816 B2 | 1/2017 | Mullen et al. |
| 9,619,741 B1 | 4/2017 | Rigatti |
| 9,639,796 B2 | 5/2017 | Mullen et al. |
| 9,646,240 B1 | 5/2017 | Mullen et al. |
| 9,652,436 B1 | 5/2017 | Yen et al. |
| 9,665,907 B2 * | 5/2017 | Hamilton, II ...... G06Q 30/0283 |
| 9,684,861 B2 | 6/2017 | Mullen et al. |
| D792,511 S | 7/2017 | Mullen et al. |
| D792,512 S | 7/2017 | Mullen et al. |
| D792,513 S | 7/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,710,745 B1 * | 7/2017 | O'Shea ............ G06K 19/07718 |
| 9,721,201 B1 | 8/2017 | Mullen et al. |
| 9,727,813 B2 | 8/2017 | Mullen et al. |
| 9,734,669 B1 * | 8/2017 | Mullen ................. G07F 17/329 |
| 9,785,988 B2 * | 10/2017 | Petri ................. G06Q 30/0609 |
| 9,805,297 B2 | 10/2017 | Mullen et al. |
| 9,818,125 B2 * | 11/2017 | Mullen ............... G06Q 30/0641 |
| 9,836,680 B1 | 12/2017 | Cloutier |
| 9,852,368 B1 | 12/2017 | Yen et al. |
| 9,875,437 B2 | 1/2018 | Cloutier et al. |
| 9,881,245 B1 | 1/2018 | Rhoades et al. |
| 9,916,992 B2 | 3/2018 | Mullen et al. |
| 9,928,456 B1 | 3/2018 | Cloutier et al. |
| 9,953,255 B1 | 4/2018 | Yen et al. |
| 10,022,884 B1 | 7/2018 | Cloutier |
| 10,032,100 B2 | 7/2018 | Mullen et al. |
| 10,055,614 B1 | 8/2018 | Cloutier et al. |
| 10,062,024 B1 | 8/2018 | Bohac, Jr. |
| D828,870 S | 9/2018 | Mullen et al. |
| 10,095,970 B1 | 10/2018 | Mullen |
| 10,095,974 B1 | 10/2018 | Mullen et al. |
| 10,137,370 B2 * | 11/2018 | Aizawa ..................... G06F 3/011 |
| 10,169,692 B2 | 1/2019 | Mullen et al. |
| 10,169,693 B1 | 1/2019 | Batra |
| 10,176,419 B1 | 1/2019 | Cloutier et al. |
| 10,176,423 B1 | 1/2019 | Mullen et al. |
| 10,181,097 B1 | 1/2019 | Mullen et al. |

(56) References Cited

U.S. PATENT DOCUMENTS

| | | | |
|---|---|---|---|
| 10,198,687 B2 | 2/2019 | Mullen et al. | |
| 10,214,936 B2 * | 2/2019 | Reddy | E04H 12/345 |
| 10,223,631 B2 | 3/2019 | Mullen et al. | |
| 10,255,545 B2 | 4/2019 | Mullen et al. | |
| 10,325,199 B2 | 6/2019 | Mullen et al. | |
| 10,395,156 B1 | 8/2019 | Batra | |
| 10,430,704 B2 | 10/2019 | Mullen et al. | |
| 10,467,521 B2 | 11/2019 | Mullen et al. | |
| 10,482,363 B1 | 11/2019 | Cloutier et al. | |
| 10,496,918 B2 | 12/2019 | Mullen et al. | |
| 10,504,105 B2 | 12/2019 | Mullen et al. | |
| 10,579,920 B2 | 3/2020 | Mullen et al. | |
| 10,627,607 B2 * | 4/2020 | Lee | G02B 13/06 |
| 10,693,263 B1 | 6/2020 | Mullen et al. | |
| 10,936,926 B1 | 3/2021 | Rhoades et al. | |
| 10,948,964 B1 * | 3/2021 | Cloutier | G06F 1/00 |
| 10,997,489 B2 * | 5/2021 | Mullen | G06K 19/07749 |
| 11,062,195 B2 * | 7/2021 | Mullen | G06K 19/083 |
| 11,144,909 B1 | 10/2021 | Mullent et al. | |
| 11,238,329 B2 | 2/2022 | Mullen et al. | |
| 2001/0034702 A1 | 10/2001 | Mockett et al. | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 * | 8/2002 | Keresman, III | C07D 209/88 |
| | | | 705/65 |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0116635 A1 | 6/2003 | Taban | |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 | 12/2003 | Finkelstein | |
| 2004/0035942 A1 | 2/2004 | Silverman | |
| 2004/0054574 A1 | 3/2004 | Kaufman et al. | |
| 2004/0133787 A1 | 7/2004 | Doughty | |
| 2004/0162732 A1 | 8/2004 | Rahim et al. | |
| 2004/0172535 A1 | 9/2004 | Jakobsson | |
| 2004/0177045 A1 | 9/2004 | Brown | |
| 2005/0043997 A1 | 2/2005 | Sohata et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0116026 A1 | 6/2005 | Burger et al. | |
| 2005/0119940 A1 | 6/2005 | Concilio et al. | |
| 2005/0154643 A1 | 7/2005 | Doan et al. | |
| 2005/0228959 A1 | 10/2005 | D'Albore et al. | |
| 2006/0000900 A1 * | 1/2006 | Fernandes | G06Q 20/24 |
| | | | 235/380 |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0131396 A1 | 6/2006 | Blossom | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0256961 A1 | 11/2006 | Brainard et al. | |
| 2007/0034700 A1 * | 2/2007 | Poidomani | G06K 19/07722 |
| | | | 235/492 |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0192249 A1 | 12/2007 | Biffle et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0029607 A1 | 2/2008 | Mullen | |
| 2008/0035738 A1 | 2/2008 | Mullen | |
| 2008/0040271 A1 | 2/2008 | Hammad et al. | |
| 2008/0040276 A1 | 2/2008 | Hammad et al. | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0058016 A1 | 3/2008 | Di Maggio et al. | |
| 2008/0059379 A1 | 3/2008 | Ramaci et al. | |
| 2008/0065555 A1 | 3/2008 | Mullen | |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0288699 A1 | 11/2008 | Chichierchia | |
| 2008/0294930 A1 | 11/2008 | Varone et al. | |
| 2008/0302869 A1 | 12/2008 | Mullen | |
| 2008/0302876 A1 | 12/2008 | Mullen | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0046522 A1 | 2/2009 | Sepe et al. | |
| 2009/0108064 A1 | 4/2009 | Fernandes et al. | |
| 2009/0150295 A1 | 6/2009 | Hatch et al. | |
| 2009/0152365 A1 | 6/2009 | Li et al. | |
| 2009/0159663 A1 | 6/2009 | Mullen et al. | |
| 2009/0159667 A1 | 6/2009 | Mullen et al. | |
| 2009/0159668 A1 | 6/2009 | Mullen et al. | |
| 2009/0159669 A1 | 6/2009 | Mullen et al. | |
| 2009/0159670 A1 | 6/2009 | Mullen et al. | |
| 2009/0159671 A1 | 6/2009 | Mullen et al. | |
| 2009/0159672 A1 | 6/2009 | Mullen et al. | |
| 2009/0159673 A1 | 6/2009 | Mullen et al. | |
| 2009/0159680 A1 | 6/2009 | Mullen et al. | |
| 2009/0159681 A1 | 6/2009 | Mullen et al. | |
| 2009/0159682 A1 | 6/2009 | Mullen et al. | |
| 2009/0159688 A1 | 6/2009 | Mullen et al. | |
| 2009/0159689 A1 | 6/2009 | Mullen et al. | |
| 2009/0159690 A1 | 6/2009 | Mullen et al. | |
| 2009/0159696 A1 | 6/2009 | Mullen | |
| 2009/0159697 A1 | 6/2009 | Mullen et al. | |
| 2009/0159698 A1 | 6/2009 | Mullen et al. | |
| 2009/0159699 A1 | 6/2009 | Mullen et al. | |
| 2009/0159700 A1 * | 6/2009 | Mullen et al. | 235/493 |
| 2009/0159701 A1 | 6/2009 | Mullen et al. | |
| 2009/0159702 A1 | 6/2009 | Mullen | |
| 2009/0159703 A1 | 6/2009 | Mullen et al. | |
| 2009/0159704 A1 | 6/2009 | Mullen et al. | |
| 2009/0159705 A1 | 6/2009 | Mullen et al. | |
| 2009/0159706 A1 | 6/2009 | Mullen et al. | |
| 2009/0159707 A1 | 6/2009 | Mullen et al. | |
| 2009/0159708 A1 | 6/2009 | Mullen et al. | |
| 2009/0159709 A1 | 6/2009 | Mullen | |
| 2009/0159710 A1 | 6/2009 | Mullen et al. | |
| 2009/0159711 A1 | 6/2009 | Mullen et al. | |
| 2009/0159712 A1 | 6/2009 | Mullen et al. | |
| 2009/0159713 A1 | 6/2009 | Mullen et al. | |
| 2009/0160617 A1 | 6/2009 | Mullen et al. | |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0288012 A1 | 11/2009 | Hertel et al. | |
| 2009/0290704 A1 | 11/2009 | Cimino | |
| 2009/0303885 A1 | 12/2009 | Longo | |
| 2009/0308921 A1 | 12/2009 | Mullen | |
| 2009/0319382 A1 | 12/2009 | Shah et al. | |
| 2010/0030651 A1 * | 2/2010 | Matotek | G06Q 20/204 |
| | | | 705/26.1 |

(56) References Cited

U.S. PATENT DOCUMENTS

| | | |
|---|---|---|
| 2010/0065628 A1 | 3/2010 | Carmichael et al. |
| 2010/0082445 A1 | 4/2010 | Hodge et al. |
| 2011/0028184 A1 | 2/2011 | Cooper |
| 2011/0078010 A1 | 3/2011 | Postrel |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0037709 A1 | 2/2012 | Cloutier et al. |
| 2012/0197708 A1 | 8/2012 | Mullen et al. |
| 2012/0209744 A1 | 8/2012 | Mullen et al. |
| 2012/0254037 A1 | 10/2012 | Mullen |
| 2012/0254038 A1 | 10/2012 | Mullen |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0290449 A1 | 11/2012 | Mullen et al. |
| 2012/0290472 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0217152 A1 | 8/2013 | Mullen et al. |
| 2013/0282573 A1 | 10/2013 | Mullen et al. |
| 2013/0282575 A1 | 10/2013 | Mullen et al. |
| 2014/0001269 A1 | 1/2014 | Hartwick et al. |
| 2014/0006129 A1* | 1/2014 | Heath .................. G06Q 30/02 705/14.23 |
| 2014/0054384 A1 | 2/2014 | Cloutier et al. |
| 2015/0186766 A1 | 7/2015 | Mullen et al. |
| 2015/0254546 A1 | 9/2015 | Hartwick et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2018/0060881 A1 | 3/2018 | Mullen et al. |
| 2018/0151391 A1 | 5/2018 | Mullen et al. |
| 2019/0026613 A1 | 1/2019 | O'Shea |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

The Bank Credit card Business the american bankers assocation 246 pages, 1996 (Year: 1996).*
The bank Credit card business (Year: 1996).*
Smart cards: State-of-the-art to future directions (Year: 2013).*
A smart card management and application system (Year: 2010).*
U.S. Appl. No. 60/594,300, Poidomani et al.
U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers http://homes.cerias.purdue.edu/~jtli/paper/fc07.pdf. As viewed on Apr. 12, 2010.
English translation of JP 05210770 A.
PCT/US11/25047, Feb. 16, 2011, Mullen.
PCT/US11/37041, May 18, 2011, Mullen et al.
PCT/US11/45991, Jul. 29, 2011, Mullen et al.
PCT/US12/31919, Apr. 2, 2012, Mullen et al.
PCT/US12/31921, Apr. 2, 2012, Mullen et al.
PCT/US12/37237, May 10, 2012, Mullen et al.
PCT/US13/26746, Feb. 19, 2013, Mullen et al.

* cited by examiner

CARDS, DEVICES, SYSTEMS, AND METHODS FOR A FEATURED APPLICATION MANAGEMENT SYSTEM

CROSS-REFERENCE TO RELATED APPLICATION

This application claims the benefit of U.S. Provisional Patent Application No. 61/693,729, titled "CARDS, DEVICES, SYSTEMS, AND METHODS FOR A FEATURED APPLICATION MANAGEMENT SYSTEM," filed Aug. 27, 2012, which is hereby incorporated by reference herein in its entirety.

BACKGROUND OF THE INVENTION

This invention relates to magnetic cards and devices and associated payment systems.

SUMMARY OF THE INVENTION

Systems and methods are provided for allowing a user to select an additional service to be performed in addition to the payment of goods with a payment card or other device (e.g., a mobile telephonic device, a tablet computer device, or another electronic device). A card, or other device, may include one or more buttons. A user may associate an additional service to a button of a card at any time. At the time of purchase, information indicative of the button that the user selected may be passed to a point-of-sale system with a user's payment information. Such data may be, for example, communicated through a merchant acquirer's network to a processing facility. The processing facility may, for example, authorize a payment transaction and forward the information indicative of the button a user selected and the identity of a user to a remote facility. Such a remote facility may, for example, forward at least some of such information, as well as additional information, to a third party application such that the third party application enacts the additional feature desired by the user.

Such an additional feature may include, for example, a game action in an online game by a game application, a check-in operation at a location by a check-in application, redemption of a coupon or voucher by a third party application, accumulation of loyalty points by a third party loyalty application, rating of a transaction or location by a rating application, any combination of such features, or any additional feature.

Selection of an application may be provided, for example, by a Graphical User Interface (GUI) provided on a computing device (e.g., a mobile telephonic device) as a software application for that device or via the internet or an intranet through a web browser. Such a selection may be provided with a non-powered card such that a single feature may be associated with a card for a period of time. Such a selection may be associated to an option (e.g., a button) on a powered card or other device (e.g., a mobile telephonic device) such that the user may associate different features with different options (e.g., different buttons). Accordingly, for example, a user may receive a powered card, or other device, in the mail and use his/her web browser to associate different additional features to different buttons. The user may then utilize the card in a store and press a button in order to select that feature. A card, or other device, may download information (e.g., via a wireless communication such as a light or electromagnetic communication) such that the card, or other device, displays information next to an option indicative of the application (e.g., "Redeem LivingSocial Voucher" or "Facebook Like"). Alternatively, no download may be provided and no additional information may be displayed such that a user's card, or other device, includes a generic descriptor (e.g., "credit" and "application," or "application 1" and "application 2," or "debit" and "application 1" and "application 2").

A remote facility may also receive additional information other than just a user identifier and information indicative of the option selected by a user (or that the user made a payment). Such additional information may be, for example, the type of merchant (e.g., a retail merchant or a gas merchant), the location of a merchant (e.g., the zip code of a merchant), the type of transaction (e.g., online or in-store purchase), the name of the merchant (e.g., "Amazon.com," or "Walmart"), the amount of the transaction (e.g., $10.25), and any other information. Such a remote facility may forward such information to a third-party application in addition to information generated by the remote facility (e.g., a second user identifier such that different identifiers are used with the facility sending payment information and the third-party application).

An ecosystem may be provided in which a development kit is available for third parties to develop applications for payment cards or other devices. A GUI may be provided where a user can select different third-party applications to be associated with a user's payment card or other device. The third-party applications may need to be approved by an administrator before being accessible by a GUI. Different categories of third-party applications may be provided on the GUI (e.g., a coupon category, a check-in category, a games category, a charity category). The development kit may provide the ability for a third-party application to, for example, receive user identification numbers and other information (e.g., merchant name and location) and provide particular information back (e.g., within a period of time) to a remote facility.

Information received from a third-party application may include, for example, information indicative that the user was properly identified and a service was performed (e.g., "check-in completed," "charity donation made."). Such information may be provided back to an issuing bank, processor, or other service provider such that the information may be displayed on a user's bill statement. Additional information may also be provided that may change the way a transaction is authorized or settled.

Additional information received from a third party may be utilized to change the way a transaction is authorized or settled. For example, a third party may provide a user with the ability to pre-purchase a voucher to a particular store (e.g., a particular barber in a particular zip code). A user may associate this third party service to a button on the user's card. A user may make a purchase at this barber multiple times during a year on the user's credit account. The user may, at one such purchase, press the button associated with the desire to use the third-party service and redeem a voucher the user already purchased or acquired. Information indicative of the user's desire to utilize such a service may be communicated to a point-of-sale terminal via a communications device located on the card (e.g., a dynamic magnetic stripe communications device, an RFID antenna, an exposed IC chip (e.g., an EMV chip), or any other communications device). The transaction may be authorized using the user's payment account if, for example, the user has enough funds associated with that account (e.g., a credit or debit account). The third-party service provider may then determine the user had a pre-paid voucher for the transaction and may return to the card issuer, processor, or other party information indicative that the user's bill is to be adjusted by the amount of the voucher. Before, or after, settlement occurs a user's bill may show a statement credit in the amount of the voucher. A remote facility may perform such a data exchange as well as any associated value exchange. For example, the remote facility may, for a fee (e.g., a percentage of a transaction or a fixed fee), provide value from the third-party service provider to the card issuer or processor (e.g., via an ACH or other type of monetary transaction). Alternatively, for example, the remote facility may provide the desired value to the card issuer, processor, or other party and demand the associated value be paid to the remote facility by the third-party application within a period of time (e.g., three days). Information provided by a third-party application to a remote facility may include an identifier indicative of the third-party application, an identifier indicative of the user, an identifier indicative of the type of service provided by the third-party application, an identifier indicative of the transaction with which further action by the third-party application is desired, an amount of a post-statement credit that is to be applied for a particular transaction, an amount of a post-settlement credit that is to be applied for a particular transaction, an amount of a pre-settlement credit that is to be applied for a particular transaction, an amount of a credit that is to be applied during an authorization, an additional fee that is supposed to be added to a statement for an additional service (e.g., a fee-based financial management tool service), and any other information desired by the third-party service provider, processor, card issuer, remote facility, device provider, or any other entity (e.g., a card network).

Information indicative of a button press, or use of a card, that triggers a feature may be provided in a payment message utilized at authorization or at settlement. Furthermore, the service provider may return information in a period of time that permits actions to be performed pre-authorization or pre-settlement.

The payment actions may be determined, for example, via a user interaction with the card. Particularly, for example, a user may press a button on the card from a group of buttons that is associated with the third-party feature. Such third-party features may be unique from the features provided to the user via the third parties non-payment card or device services. Accordingly, a user may obtain the benefit of the whimsical and festive nature of a unique feature every time the user makes a payment. Information indicative of feature selection may be provided, for example, via an output device operable to be read by a card reader. For example, the feature may be provided by a dynamic magnetic stripe communications device, an RFID antenna, an exposed IC chip, or any other type of card reader communications device. For online purchases, for example, a display may be provided on the card and a user selection may cause a particular number (e.g., a particular code) to be displayed on the card. Such a code may be entered into a text box on a website at checkout and may be representative of the user's desired feature. Accordingly, the feature may be communicated to a remote server such that the feature may be performed in the third party service on behalf of the user. The code may additionally provide the benefits of a security code and may be entered with a payment card number (e.g., a credit or debit card number) at online or in-store checkout.

Rewards may be awarded based on the amount of a purchase. Such rewards may be associated with a third-party service or a card issuer, device or card provider, or other entity. For example, an amount of game currency may be awarded by a game provider at every purchase instead of a card issuer providing an amount of points, miles, or cash-back to a user. Alternatively, for example, a user may earn both rewards from a card issuer as well as rewards from a third-party service provider. A user may select, via, for example, physical buttons on the card or virtual buttons on a capacitive-sensitive display of a mobile telephonic device, the type of feature the user desires. Multiple features may be provided from a particular third-party service provider. For example, a game service provider may provide a feature associated with one game action and another feature associated with another game action.

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

Electronics may be embedded between two layers of a polymer (e.g., a PVC or non-PVC polymer). One or more liquid polymers may be provided between these two layers. The liquid polymer(s) may, for example, be hardened via a reaction between the polymers (or other material), temperature, or via light (e.g., an ultraviolet or blue spectrum light) such that the electronics become embedded between the two layers of the polymer and a card is formed.

A payment card or other device may receive information indicative of a feature desired to be added by a user. The payment card may communicate information indicative of the feature with payment card data associated with the card or a user selection. The payment data and feature information may be routed, for example, to an authorization server. The authorization server may authorize payment and, based on the authorized payment, communicate the feature information to a remote server. The remote server may utilize this remote information to impact a third-party service. The feature information may, for example, be routed before the payment card data reaches an authorization server. At merchant settlement, charge backs for a purchase associated with a game action may cause the feature to be reversed or a different feature to be implemented (e.g., a removal of rewards earned at authorization). The feature may be implemented at settlement upon confirmation that, for example, no chargeback was associated with the payment transaction.

A graphical user interface (GUI) may be used by a user to help the user in selecting various features to be added by the user. The GUI may, for example, be accessible via a network (e.g., the internet) and may be rendered onto a device (e.g., a mobile telephonic device, a tablet computer device, or another electronic device) to allow the user to select the one or more features to be performed by third-party applications in addition to an initial transaction (e.g., a purchase transaction) that the user may have requested.

A GUI may be accessed, for example, via a web browser of a card or other device (e.g., a mobile telephonic device, a tablet computer device, or another electronic device) in order to render a list of third-party applications that may be currently featured to aid the user in his or her selection. For example, a "featured" tab may be rendered by the GUI onto a device's web browser to allow the user to access third-party applications that may be of interest to the user. A "currently featured" sub-tab may be rendered by the GUI onto a device's web browser to allow the user to access third-party applications that are currently being featured. Currently featured third-party applications may achieve "currently featured" status any number of different ways, which may include being a newly added third-party application, a newly added component to an existing third-party application, an existing third-party application that has not achieved "currently featured" status after a threshold amount of time, or any other way.

Third-party applications not achieving "currently featured" status may be categorized into a different status category (e.g., "previously featured"). Third-party applications achieving "previously featured" status may achieve such a status any number of ways, which may include being removed from the "currently featured" status category. Accordingly, for example, any active third-party application may either exist in the "currently featured" status category or the "previously featured" status category.

A third-party application may exist in either of the "currently featured" or the "previously featured" status categories and may be selected by a user via the GUI that is rendered onto the user's card or other device. Third-party applications may, for example, be advertised in either of the "currently featured" or "previously featured" categories and the "currently featured" and/or the "previously featured" lists of third-party applications may be activated via a user event within the GUI (e.g., the user may mouse-over to a tab in the GUI and activate the tab using a mouse click).

Once a status category is selected, a list of third-party applications belonging to the selected status category may be rendered by the GUI onto the user's display. If more third-party applications exist than may be rendered onto the display, the GUI may render a scroll bar onto the user's display so that the user may individually scroll through the list of advertisements for the third-party applications that may exist within the selected category.

Within each advertisement, summary information may be rendered by the GUI onto the display of the user's card or other device. Other person-machine interface (PMI) components (e.g., virtual buttons) may be rendered onto each advertisement by the GUI to allow a user to obtain detailed information about the selected third-party application within the selected category. For example, a "learn more" button may be rendered within the summary advertisement of the selected third-party application within the selected category that when pressed (e.g., by a mouse-over click event) may render detailed content concerning the selected third-party application.

The detailed content may, for example, provide details as to the added functionality of the third-party application when a transaction (e.g., a purchase transaction) is performed subsequent to the activation of the third-party application. For example, the detailed content may explain that when purchases are made with the selected third-party application, certain events may occur (e.g., any purchase valued at $10 or more made at any merchant retail outlet may cause a sports/entertainment card from UpperDeck to be emailed to the user's card or other device). As per another example, the detailed content may explain that when purchases are made with the selected third-party application, certain events may occur (e.g., a piggyback transaction of $1.50 may be added to any merchant's transaction amount to cause seven sports/entertainment cards from UpperDeck to be emailed to the user's card or other device).

A user may be given an opportunity to customize the added features of a third-party application via the detailed content rendered by the GUI. For example, a user may choose a particular category of sports/entertainment cards (e.g., football cards) such that when purchases are made with that particular third-party application selected, virtual football cards may be emailed to the user when qualifying purchases are made. Links to cards received by the user may be added by the GUI and rendered on the display of the user's card or device. A link may be activated (e.g., by a mouse-over and click event) by the GUI to allow the user to view a representation of a particular sports/entertainment card and select that particular sports/entertainment card received by the user (e.g., emailed to the user) after a qualifying event (e.g., a purchase having a qualifying purchase amount) occurs.

Third-party applications existing in the "previously featured" status category may be selected by a user via the GUI that is rendered onto the user's card or other device. Summary information about the previously featured third-party application may include information (e.g., the date that the third-party application was originally featured). "Learn more" virtual buttons may also be rendered within the "previously featured" third-party application summaries so that detailed information may be rendered onto the user's display when the "Learn More" virtual buttons are activated. Third-party applications previously activated by the user may be communicated as such to the user via the GUI, so that the user may be reminded as to which of the currently featured and/or previously featured third-party applications have been associated with the user's powered or non-powered card.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
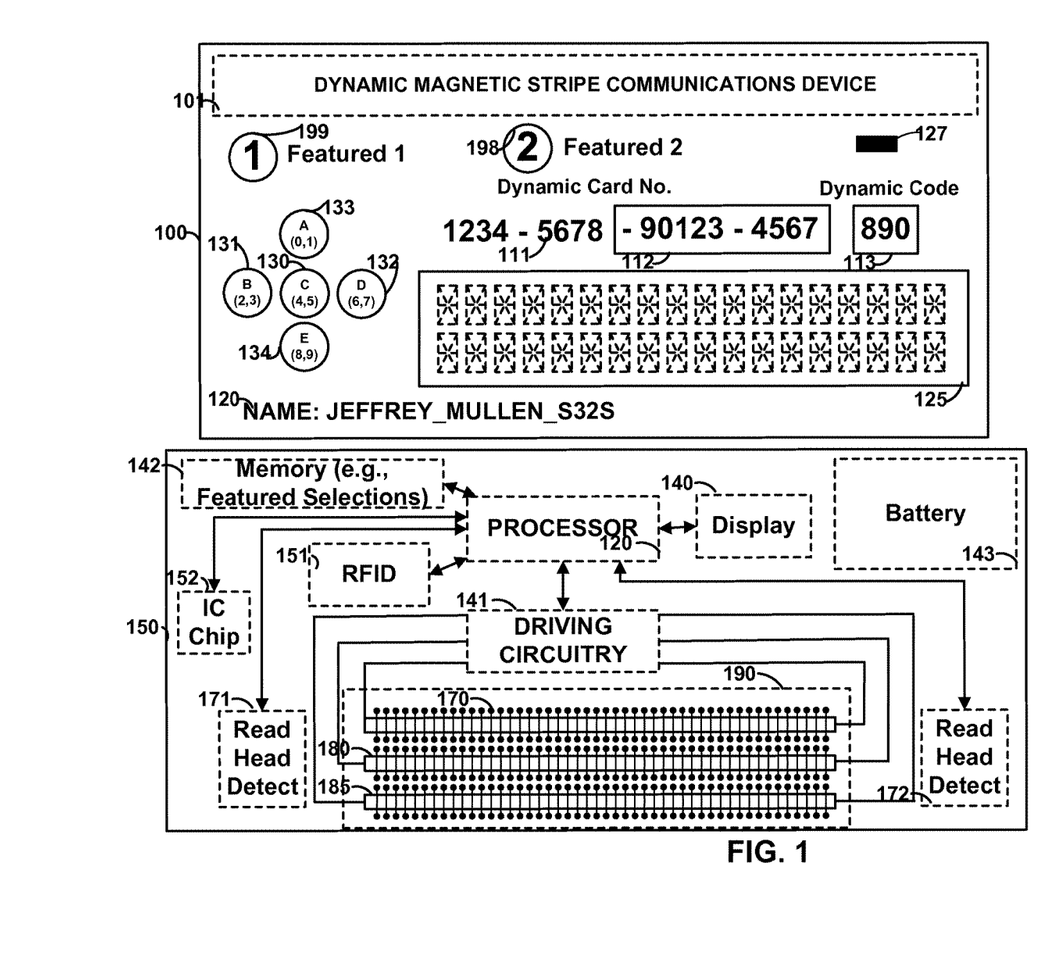
FIG. 1 is an illustration of a card and architecture constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or a non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination of mechanical and capacitive buttons.

Card 100 may include button 199. Button 199 may be used, for example, to communicate information through dynamic magnetic stripe communications device 101 indicative of a user's desire to communicate the selection of a third-party application that may be featured by a user's web-based GUI. Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user selection (e.g., to communicate details of a different third-party application that is featured by a user's web-based GUI).

Multiple buttons may be provided on a card and each button may be associated with different user selections. Light sensor 127 may be provided, for example, to receive information from a display (e.g., a display of a mobile telephonic device or a display of an electronic tablet). Display 125 may allow a user to select (e.g., via buttons) options on the display that instruct the card to communicate (e.g., via a dynamic magnetic stripe communications device, RFID, or exposed IC chip) to use a debit account, credit account, pre-paid account, or point account for a payment transaction.

Button 198 and button 199 may each be associated with, for example, a different third-party application and may be changed by a user at any time. The third-party application associated with a button may be changed by a user on a GUI (e.g., a web-based GUI) provided by a device provider, remote facility provider, card issuer, processor, or any other entity. For example, a third-party service provider may, on its website or application, allow a user to change the third-party application that is executed when the third party's application button is selected by a user on the user's card or other device.

For example, suppose a third party service provider provides a check-in feature at particular stores and then presents the fact that the user has checked into a location on a profile page of the user. One action may be to check-into the location using a payment transaction as the check-in. When a transaction is performed, a user's profile may be updated that the user has checked-into that location. When a purchase transaction is performed, a user's profile may be updated that the user has made a purchase at the check-in. Another action may be to use a purchased product as the check-in. When a transaction is performed, a user's profile may be updated that the user has made a purchase of a particular item at the check-in. For example, a user may be provided with a GUI (e.g., on the user's mobile telephonic device) when the user makes a purchase to identify the goods that the user has purchased. In doing so, features may be enhanced with additional information from a user after a purchase has been made.

The selection of a third-party application may or may not have a cost associated with it. If a cost is associated with the third-party application, for example, the cost may be added to a customer's statement (e.g., added to a credit or debit purchase) for a particular transaction. A fixed-fee or variable-fee (e.g., a percentage of the transaction) may then be removed from the fee charged to the user and distributed among particular parties (e.g., distributed among the card issuer and/or device provider). The remainder of the fee may be provided, for example, to the third-party service provider. A cost may be associated with a third-party application selection, but may not be a cost to a user. Instead, for example, the cost may be a cost to a third-party service provider. The cost may be provided, for example, to other entities such as, for example, the device provider, card issuer, card processor (which may be the same, for example, as the card issuer), or any other entity (e.g., card network).

Architecture 150 may be utilized with any card. Architecture 150 may include processor 120. Processor 120 may have on-board memory for storing information (e.g., featured third-party selections). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data, for example, that is unique to a particular card. Memory 142 may include any type of data. For example, memory 142 may store discretionary data codes associated with buttons of a card (e.g., card 100 of FIG. 1). Such codes may be recognized by remote servers to effect particular actions. For example, a code may be stored on memory 142 that causes a third-party application to be executed by a remote server (e.g., a remote server coupled to a third-party service provider such as an online voucher or coupon provider). Different third-party applications may be associated with different buttons. Or, for example, a user may scroll through a list of third-party applications on a display on the front of the card (e.g., using buttons to scroll through the list). A user may select the type of payment on card 100 via manual input interfaces corresponding to displayed options on display 125. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

A card may include, for example, any number of light sensors. Light sensors may be utilized such that a display screen, or other light emitting device, may communicate information to light sensors 127 via light.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and/or 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Architecture 150 may also include, for example, a light sensor. Architecture 150 may receive information from a light sensor. Processor 120 may determine information received by a light sensor.

Figure 2:
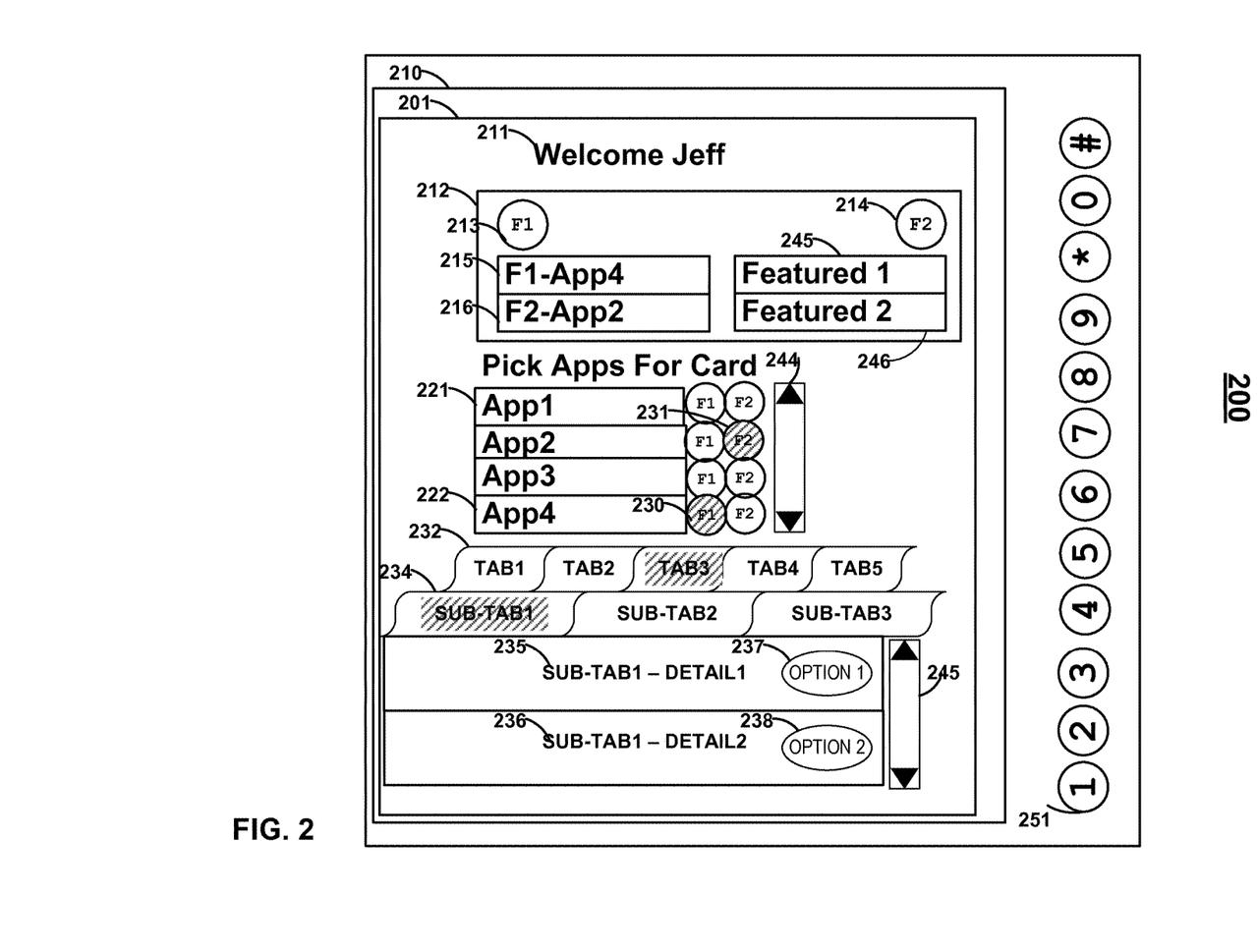
FIG. 2 is an illustration of a device constructed in accordance with the principles of the present invention.

FIG. 2 shows device 200. Device 200 may include one or more physical buttons 251, display screen 210 (e.g., a touch display screen such as a capacitive-touch or resistive-touch display screen), GUI 201 (e.g., a rendering of a web-based GUI), text 211, virtual card 212, virtual indicia 213 and 214, field descriptors 215 and 216, featured application messages 245 and 246, applications 221-222, application selection buttons 230 and 231. Scroll bar 244 may allow multiple third-party applications to be displayed and selected via corresponding application selection buttons. Scroll bar 245 may allow multiple sets of sub-tab details (e.g., currently featured or previously featured third-party application details).

Virtual tabs 232 and virtual sub-tabs 234 may be included to render information (e.g., third-party application information) within sub-tab detail areas 235 and 236. Options 237 and 238 may be activated (e.g., via a mouse-over and click event) to obtain detailed information (e.g., details concerning third-party application information).

A user may associate a card, such as a powered or non-powered card, using a GUI for managing third-party applications. Such a GUI may be provided, for example, on a remote facility and displayed on a display to allow a user to change the third-party applications that may be associated with a card. In this manner, a user may utilize a GUI to be provided with an ecosystem of applications and may, for example, select, at any time, a particular application to associate with a card or a card button. Persons skilled in the art will appreciate that a default feature may be provided or that a number of features provided by a card issuer or entity may be provided in addition to third-party application functionality. For example, a card issuer may provide a card with a default on one button for credit and a default for a second button as decoupled debit. A user may press the first button to perform a credit transaction. A user may press the other button to perform a decoupled debit transaction.

Virtual card 212 may be provided as a representation of a user's physical card associated with a GUI. A user may be provided with the ability to change between multiple physical cards and configure the features associated with those multiple physical cards. Accordingly, virtual card 212 may be provided with indicia 213 in the configuration of, and indicative of, one physical button associated with a user's physical card and virtual card 212 may be provided with indicia 214 in the configuration of, and indicative of, another physical button associated with a user's physical card. Fields 215 and 216 may include the features associated with each button. Accordingly, a user may, for example, view virtual card 212 in order to refresh the user's memory of the features associated with the physical buttons on a user's physical card (not shown). GUI 201 may be, for example, provided as an application for a device (e.g., a portable computing device or a mobile telephonic device) or retrieved information from a web browser. Text 211 may, for example, identify the user associated with virtual card 212 and the corresponding physical card (not shown).

A list of applications may be provided on a display of a card or other device. A user may, for example, select different applications to be associated with a particular card or a particular button on a card. For example, selection 230 may associate the corresponding application to the physical button of a card associated with virtual button 213. Selection 231 may associate the corresponding application to the physical button of a card associated with virtual button 214. In doing so, a user may change the features of a card by using GUI 201. A physical card (not shown) may communicate information indicative of the button that was pressed with other payment data (e.g., an account number, security code, and other data). For example, information indicative of the button that was pressed may be included in discretionary data of a payment message. A payment message may be, for example, one or more tracks of magnetic stripe data (e.g., communicated from a dynamic magnetic stripe communications device), an RFID message (e.g., an NFC message from a radio frequency antenna), or an exposed IC chip message (e.g., an EMV message) from an exposed IC chip. Such information may be passed to a card issuer or processor from a point-of-sale terminal and any intermediary devices (e.g., a merchant acquirer processing server) and the information may be passed to a remote facility (e.g., a facility providing a GUI) such that the remote facility may determine the button that was pressed by a user. This remote facility may, in turn, retrieve information associated with the third-party application (or a feature of a card issuer, processor, application manager provider, or any entity) and forward information to that application provider such that the application may be executed. Additional information may be returned to the entity that provided the information indicative of the button the user pressed. Persons skilled in the art will appreciate that if, for example, a non-powered card is utilized, then information indicative that a purchase was made may be provided to an application manager provider such that the application manager provider can initiate the desired feature for the non-powered card. For non-powered cards, for example, features may be associated with different types of purchases such as, for example, one application may be provided for a particular merchant type (e.g., a game feature for gas purchases) and another application may be provided for a different merchant type (e.g., a reward feature for transportation purchases). Applications may be associated with other characteristics of a purchase such as, for example, a purchase above a particular amount (e.g., at or above $100) or a purchase below a particular amount (e.g., below $100). Such additional application selections may be provided, for example, for powered cards and devices.

GUI 201 may be provided, for example, on a card issuer's website such as, for example, on a bill statement web page. GUI 201 may be provided, for example, above the bill statement or to the right of the bill statement. Accordingly, for example, a user may utilize the GUI to manage application features when the user is logged into his/her account. Similarly, a third-party application provider may utilize GUI 201 as part of a user's administration or experience of that third party's service. Accordingly, for example, a user's profile page for a third party service may include GUI 201. In this manner, the GUI provider may provide web-code that retrieves GUI 201 from a remote facility managed by the GUI provider.

Tab selection 232 may be utilized by a user to obtain a listing of featured applications (e.g., third-party applications that are featured within the GUI based on time). Tab selection 234 may be utilized by a user to select a listing of featured applications that are the most recently featured applications (e.g., currently featured applications) or that have been featured in the past at some point in time (e.g., previously featured applications). Sub-tab 235 may provide detail to explain the functionality of a first featured third-party application that pertains to the sub-tab 234 selection. Sub-tab 236 may provide detail to explain the functionality of a second featured third-party application that pertains to the sub-tab 234 selection. Scroll bar 245 may be utilized to scroll through multiple other third-party applications that may pertain to the sub-tab 234 selection.

A card may be provided with one button for a particular payment account (e.g., credit) and one button for a third-party application. Accordingly, a user may, for example, only need to remember one application associated with a card. A credit account may include rewards such as points, cashback, or miles from the card issuer. Accordingly, pushing the payment account button may earn the user such rewards. Pushing the third-party application button may, alternatively, for example, not earn the user such rewards and may instead initiate execution of the third-party application. In doing so, for example, the cost of providing a card may be reduced in that the cost of rewards for the card may be reduced. A third-party application may include, for example, a feature from the card issuer, such as the ability for a user to earn a particular amount of points (e.g., 100) for a particular dollar amount added to a purchase (e.g., $1).

A third-party application associated with a button may, for example, initiate an additional transaction (e.g., a piggyback transaction) to occur in addition to a purchase transaction being initiated by a card or device. For example, a button may be pressed and associated payment information may be communicated that may cause a third party to charge additional funds as a second transaction (e.g., a piggyback transaction) that may be associated with a first transaction. Accordingly, for example, a customer may receive goods and/or services from the third party once the piggyback transaction settles in addition to any goods and/or services that may have been purchased by the customer during the first transaction.

Figure 3:
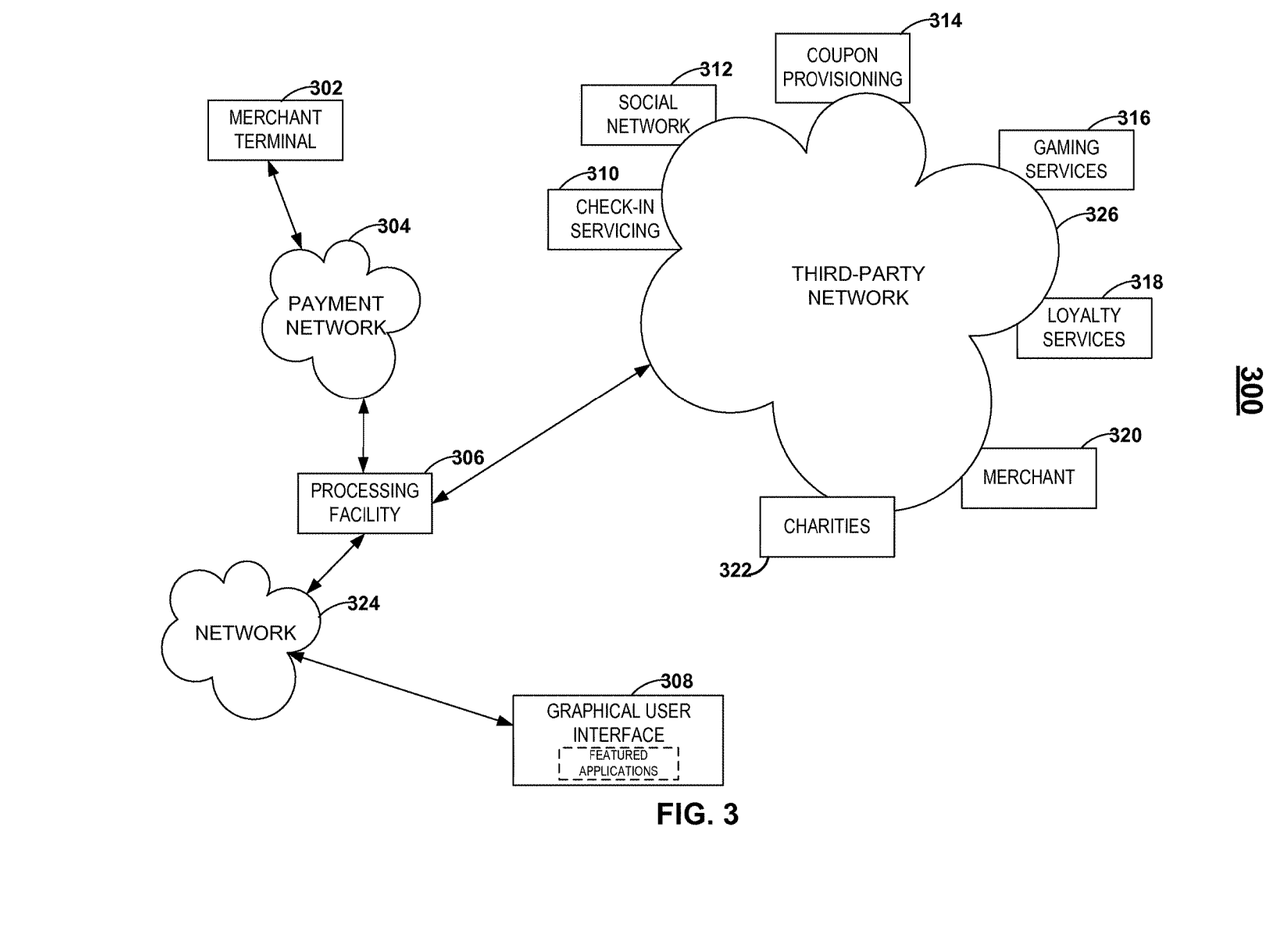
FIG. 3 is an illustration of a network constructed in accordance with the principles of the present invention.

FIG. 3 shows network 300 that may include third-party network 326 and various third-party applications 310-322. Network 300 may, for example, include merchant terminal 302 (e.g., a magnetic stripe reader, an EMV reader, an RFID reader, or an NFC reader) that may initiate transactions (e.g., point-of-sale transactions) and may complete such transactions via payment network 304. Payment network 304 may, for example, include issuers, merchant acquirers, processors, and/or other network entities that may be required to process, authorize, and/or settle transactions initiated by merchant terminal 302.

Processing facility 306 may, for example, receive messages from payment network 304 (e.g., from a processor within payment network 304) that may be related to at least a portion of transactions conducted within payment network 304. Customers associated with processing facility 306 may, for example, elect to distribute at least a portion of data processed within payment network 304 with the various third-party applications of third-party network 326.

GUI 308 may be accessed by a network (e.g., internet 324) where user preferences and other experience-related details may be selected by each user to, for example, define what data, if any, may be provided to processing facility 306 by payment network 304. A user may select at least a portion of the data provided by payment network 304 to processing facility 306 to be shared with third-party applications 310-322.

GUI 308 may be used to define user preferences, which may determine how payment network 304, processing facility 306, third-party network 326, and third-party applications 310-322 interact for every transaction conducted by that user. A user may, for example, present a non-powered card to merchant terminal 302 to complete a particular purchase transaction. User preferences within GUI 308 may, for example, be defined by the user to allow details of such a transaction to be communicated by payment network 304 to processing facility 306, which may then share at least a portion of such details and/or other details with one or more third-party applications 310-322. A user may, for example, present a powered card to merchant 302 to complete a purchase transaction. Prior to presentment, the customer may have selected (e.g., via one or more button presses on the powered card) one or more additional actions to be taken besides the processing of a purchase transaction by payment network 304 in accordance with the user preferences as selected by the user within GUI 308.

A user may, for example, press a button on a powered card that may be associated with communicating a payment message (e.g., a magnetic stripe message) to merchant terminal 302. Such a button press may, for example, further populate the magnetic stripe message (e.g., populate a discretionary data field within the magnetic stripe message) with a directive to share at least a portion of purchase transaction details conducted at merchant terminal 302 with a particular third-party application (e.g., merchant 320). User preferences may, for example, be selected within GUI 308 by the user to determine which actions are to be conducted by the one or more third-party applications 310-322.

A user may press a button on a powered card that in accordance with user preferences selected by GUI 308 may, for example, cause a data string to be communicated from payment network 304 (e.g., from a processor within payment network 304) to processing facility 306 that may contain details of a purchase transaction initiated at merchant terminal 302. Processing facility 306 may, for example, compare user information (e.g., payment account number and/or payment account holder's name) that may be contained within the data string to a user database to obtain a customer ID (e.g., a customer token) that may be associated with the user information. Sensitive information within the data string (e.g., payment account number and/or payment account holder's name) may be replaced with the customer token and then stored either locally within processing facility 306 or remotely to processing facility 306.

The data string, for example, may further contain information that may be indicative of which button was pressed on the powered card before being presented to merchant terminal 302. Using the button press information in addition to the user preferences selected by GUI 308, processing facility 306 may populate a third-party message with details that may be communicated to a third-party application (e.g., merchant 320).

As per an example, a user may elect to share certain transaction information with merchant 320 each time a certain button is pressed on the user's powered card before presentment to merchant terminal 302 for payment. Such information may include, for example, merchant information (e.g., merchant's address), date/time information of the purchase, amount of the purchase, type of purchase made, and any other information (e.g., the customer ID associated with the customer's merchant account) that may be selected by the user via the user preferences selected within GUI 308. Accordingly, for example, the selected information may be automatically gathered by processing facility 306, populated within a third-party message and communicated to merchant 320 via third-party network 326 (e.g., the internet).

Upon receipt of the third-party message, merchant 320 may initiate a second transaction (e.g., a piggyback transaction). The second transaction may be communicated to processing facility 306 via third-party network 326 (e.g., the internet) and processed by processing facility 306 accordingly.

GUI 308 may, for example, be a GUI that may be rendered onto a display of a user's card or other device (e.g., a mobile telephonic device). One or more third-party applications 310-322 may be featured applications within GUI 308. Such featured applications may be advertised by processing facility 306 via network 324 and GUI 308 so that the user may gain summary and/or detailed information concerning such featured applications. Based upon information gleaned from the detailed information concerning the featured applications, the user may be better informed as to which third-party applications he or she may wish to associate with his or her powered or non-powered card. Accordingly, the whimsical and festive nature of a user's experience with GUI 308 may be further enhanced.

Featured applications within GUI 308 may be further categorized into "currently featured" applications and "previously featured" applications. Currently featured applications may, for example, include one or more third-party applications 310-322 that may have been flagged by processing facility 306 as being currently featured applications based upon one or more variables (e.g., the timing of the offering of the application, the popularity of the application, and the length of time that the application has been available). Previously featured applications may, for example, include one or more third-party applications 310-322 that may have been flagged by processing facility 306 as being previously featured applications based upon one or more variables (e.g., previous membership as a currently featured application, the popularity of the application and the length of time that the application has been available).

Figure 4:
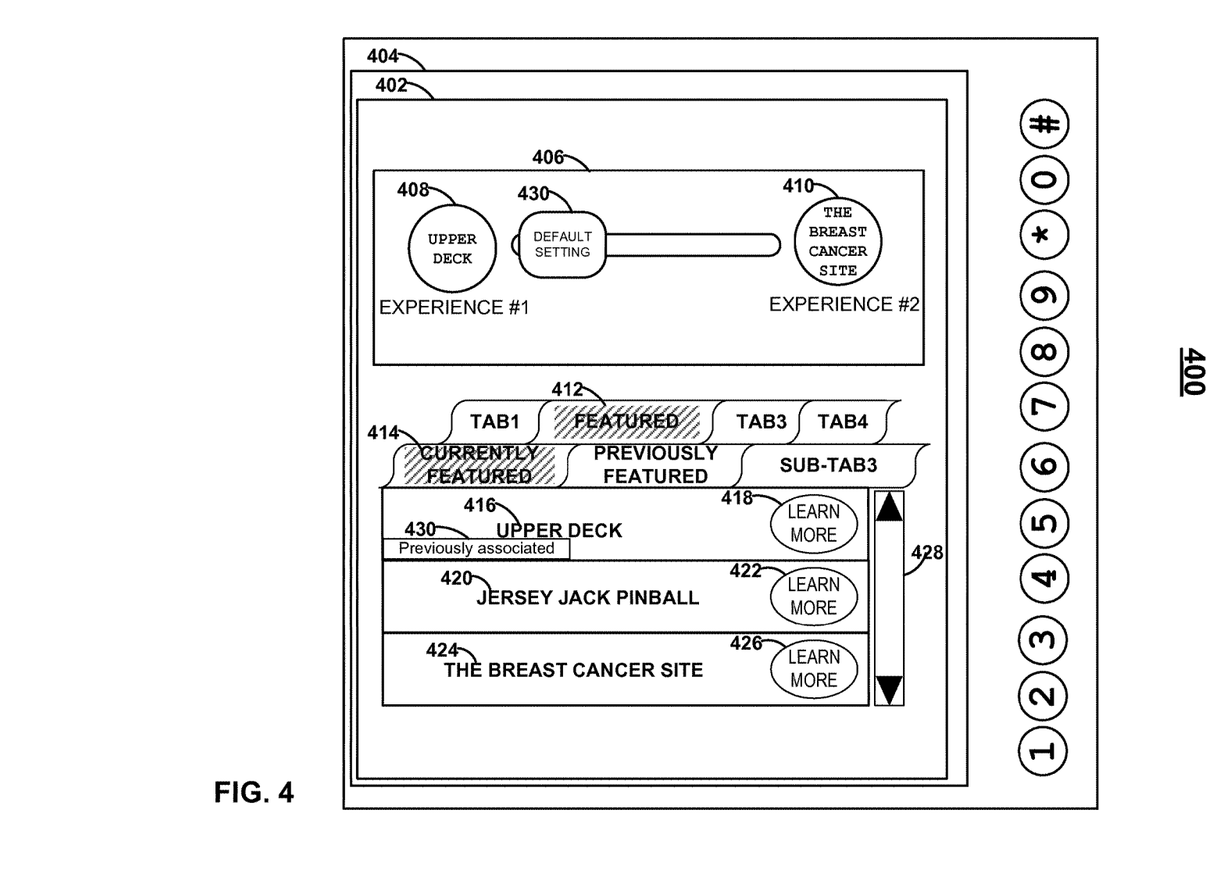
FIG. 4 is an illustration of a device constructed in accordance with the principles of the present invention.

FIG. 4 shows device 400 (e.g., a card, a mobile telephonic device, a laptop computer, a desktop computer or an electronic tablet) that may include display 404. Device 400 may include a processor that may render GUI 402 onto display 404. GUI 402 may represent one or more components of a GUI that may allow a user of device 400 to select various aspects of that user's experience when using either of a powered or a non-powered card.

Virtual card 406 may be rendered onto GUI 402 and virtual card 406 may be a virtual representation of a user's physical card. Accordingly, for example, the functionality of virtual button 408 and virtual button 410 may be established via GUI 402, such that when the user utilizes (e.g., during processing of a purchase transaction) his or her physical card that is associated with virtual card 406, the established functionality may be performed.

As per an example, the functionality of a third-party application (e.g., UpperDeck 416) may be associated with virtual button 408 via GUI 402 and the functionality of a different third-party application (e.g., the Breast Cancer Site 424) may be associated with virtual button 410 via GUI 402. Accordingly, when the user's physical card is used (e.g., during a purchase transaction) and either of the physical buttons corresponding to virtual buttons 408 or 410 is pressed on the user's physical card, the functionality associated with the associated third-party application may be executed in addition to the completion of the purchase transaction.

A user's non-powered card may be similarly used. Slide bar 430, for example, may be adjusted via GUI 402, whereby slide bar 430 either exists in proximity to virtual button 408 or exists in proximity to virtual button 410. The proximate location of slide bar 430 may, therefore, select the default functionality of the user's card. As per one example, a user's card may be a non-powered card (e.g., a card without buttons). Accordingly, the non-powered card may be used to execute additional functionality as defined by slide bar 430 such that if slide bar 430 is proximate to virtual button 408, then a third-party application (e.g., upper deck 416) is executed in addition to the transaction conducted using the user's non-powered card. Alternately, if slide bar 430 is proximate to virtual button 410, then a third-party application (e.g., the breast cancer site 424) is executed in addition to the transaction conducted using the user's non-powered card.

On-line purchases may also be used to initiate additional functionality. If either of the user's powered card or non-powered card is used for online purchases, for example, then the proximate location of slide bar 430 may be similarly used to select the functionality desired. If slide bar 430 is proximate to virtual button 408, for example, then a third-party application (e.g., upper deck 416) is executed in addition to the transaction conducted online. Alternately, if slide bar 430 is proximate to virtual button 410, then a third-party application (e.g., the breast cancer site 424) is executed in addition to the transaction conducted online.

GUI 402 may, for example, provide guidance to the user of device 400 as to which third-party applications are featured (e.g., which third-party applications are available to be associated with a user's powered or non-powered card). For example, a user may mouse over and click on a navigational tab (e.g., featured tab 412) and the user may further mouse over and click on a navigational sub-tab (e.g., currently featured sub-tab 414). In so doing, the user may cause those third-party applications having a flagged status (e.g., a currently featured flagged status) to be listed (e.g., next to scroll bar 428). A currently featured flagged status may, for example, indicate to the user of device 400 that the currently featured third-party application is currently featured for any one or more reasons (e.g., the third-party application is a relatively newly offered third-party application, the third-party application has not been featured within a threshold amount of time, the third-party application is rated highly, or the third-party application is sought to receive higher visibility). For each currently featured third-party application, a user of device 400 may gain further knowledge of the third-party application by mousing over and clicking one or more buttons 418, 422 or 426 to launch a different window within GUI 402 in order to obtain additional information about the third-party application.

A user may obtain status, for example, as to whether a currently featured third-party application had been previously associated with a user's powered or non-powered card. Status 430 may, for example, be tagged onto a listing of a currently featured third-party application so as to provide the user with a feedback status as to whether a currently featured third-party application had been previously associated by the user to the user's powered or non-powered card.

Figure 5:
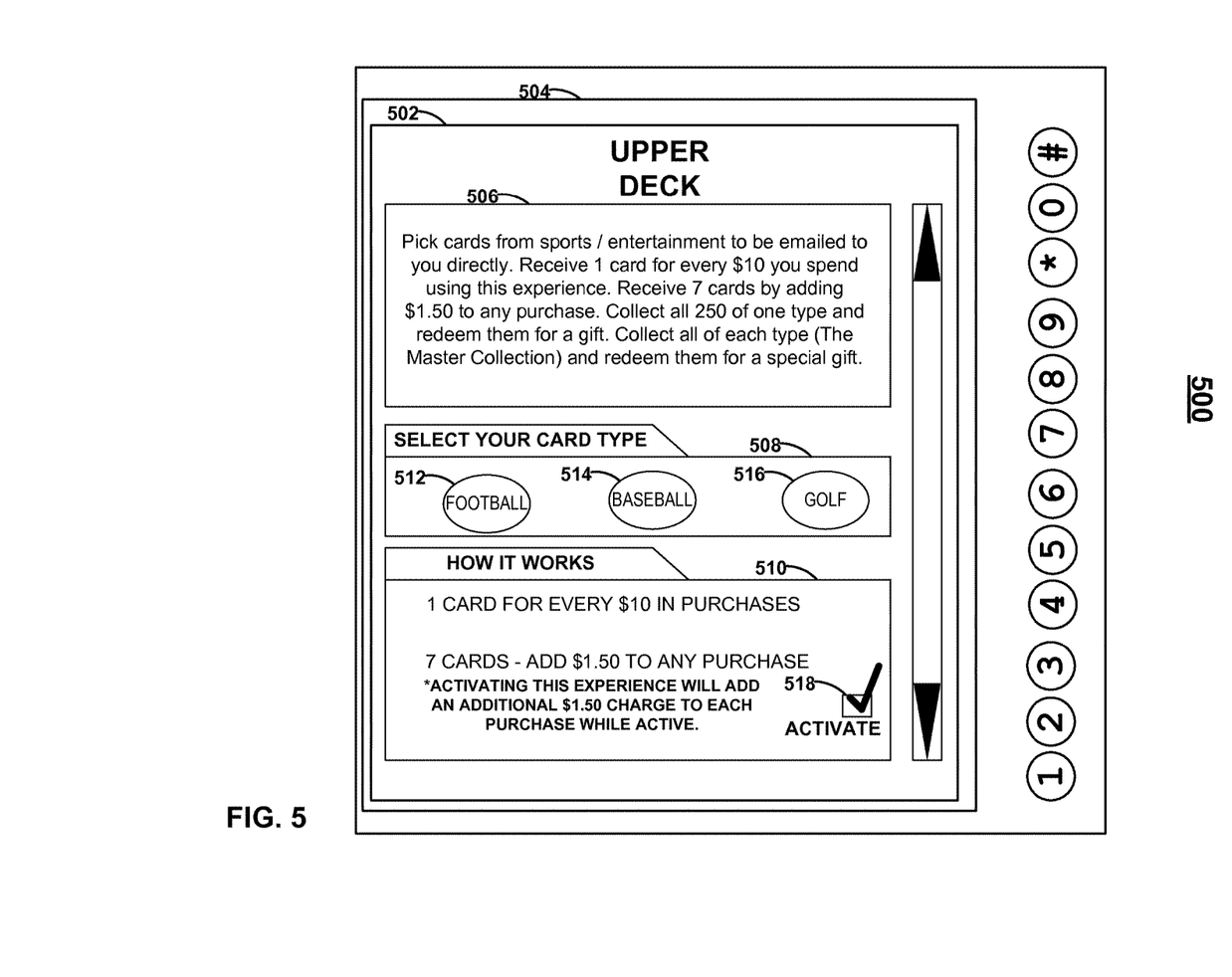
FIG. 5 is an illustration of a device constructed in accordance with the principles of the present invention.

FIG. 5 shows device 500 (e.g., a card, a mobile telephonic device, a laptop computer, a desktop computer or an electronic tablet) that may include display 504. Device 500 may include a processor that may render GUI 502 onto display 504. GUI 502 may represent one or more components of a GUI that may allow a user of device 500 to gain access to further information concerning a currently featured third-party application.

Text portion 506 may, for example, provide a user of device 500 with general information concerning a currently featured third-party application. For example, a user may be generally advised that selection of the currently featured third-party application (e.g., Upper Deck application) followed by a purchase transaction may cause one sports/entertainment card to be emailed to the user for each $10 in purchases that the user transacts with either of a powered or non-powered card. Further, the user may be generally advised that selection of the currently featured third-party application (e.g., Upper Deck application) followed by a purchase transaction may cause seven sports/entertainment cards to be emailed to the user, but only when the user has authorized such a piggyback transaction (e.g., via selection of radio button 518). Further, the user of device 500 may also select which type of sports/entertainment card to receive when a purchase is made (e.g., via mouse-over and click on options 512-516).

Figure 6:
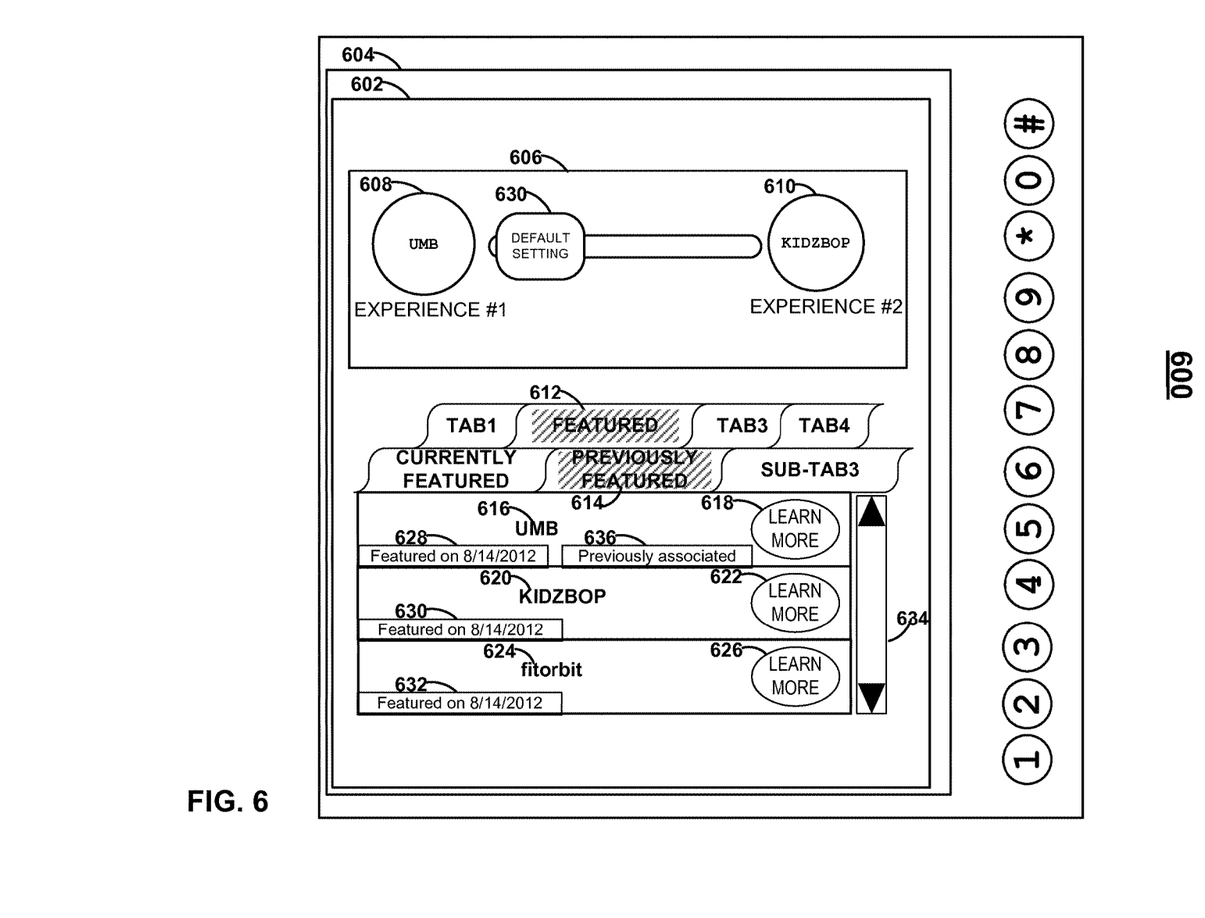
FIG. 6 is an illustration of device constructed in accordance with the principles of the present invention.

FIG. 6 shows device 600 (e.g., a card, a mobile telephonic device, a laptop computer, a desktop computer or an electronic tablet) that may include display 604. Device 600 may include a processor that may render GUI 602 onto display 604. GUI 602 may represent one or more components of a GUI that may allow a user of device 600 to gain access to further information concerning a previously featured third-party application.

GUI 602 may, for example, provide guidance to the user of device 600 as to which third-party applications are featured (e.g., which third-party applications are available to be associated with a user's powered or non-powered card). For example, a user may mouse over and click on a navigational tab (e.g., featured tab 612) and the user may further mouse over and click on a navigational sub-tab (e.g., previously featured sub-tab 614). In so doing, the user may cause those third-party applications having a flagged status (e.g., a previously featured flagged status) to be listed (e.g., next to scroll bar 634). A previously featured flagged status may, for example, indicate to the user of device 600 that the previously featured third-party application is previously featured for any one or more reasons (e.g., the third-party application is a relatively old third-party application, the third-party application has been currently featured in a threshold amount of time, the third-party application is not rated highly, or the third-party application is sought to achieve a lower visibility). For each previously featured third-party application, a user of device 600 may gain further knowledge of the third-party application by mousing over and clicking one or more buttons 618, 622 or 626 to launch a different window within GUI 602 in order to obtain additional information about the third-party application.

Each third-party application listed as previously featured third-party applications may, for example, provide a time stamp (e.g., time stamps 628-632) as to when the third-party applications were featured (e.g., when the applications were made available to be associated with a user's powered or non-powered card).

A user may obtain status, for example, as to whether a previously featured third-party application had been previously associated with a user's powered or non-powered card. Status 636 may, for example, be tagged onto a listing of a previously featured third-party application so as to provide the user with a feedback status as to whether a previously featured third-party application had been previously utilized by the user.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A device comprising:
    a display operable to display a graphical user interface, said graphical user interface including
        a virtual payment card including a virtual button, said virtual payment card associated with a physical payment card and said virtual button associated with a physical button of said physical payment card; a selection; and
        a list of third-party applications,
    wherein said list of third-party applications is one of a currently featured list of third-party applications or a previously featured list of third-party applications,
    said selection is operable to switch said list of third-party applications from said previously featured list to said currently featured list,
        said currently featured list of third-party applications includes only a first subset of all third-party applications available to a user,
        said previously featured list of third-party applications includes only a second subset of all third-party applications available to a user,
        said currently featured list of third-party applications and said previously featured list of third-party applications are provided by an entity other than said user, and
    one third party application from among all third party applications available to said user is associated with said virtual button.

2. The device of claim 1, further comprising:
a processor operable to control said display.

3. The device of claim 1, further comprising:
a processor operable to control said display, and
a communication device operable to receive said graphical user interface.

4. The device of claim 1, wherein said device is a mobile telephonic device.

5. The device of claim 1, wherein said device is a tablet computer device.

6. The device of claim 1, wherein said device is a portable computing device.

7. The device of claim 1, further comprising:
a touch sensitive sensor.

8. The device of claim 1, further comprising:
a capacitive sensor.

9. The device of claim 1, wherein said display is a touch display screen.

10. The device of claim 1, wherein said display is a capacitive-touch screen.

11. The device of claim 1, wherein said display is a resistive-touch screen.

12. The device of claim 1, further comprising:
a display driver circuit.

13. The device of claim 1, further comprising:
telephonic circuitry.

14. The device of claim 1, further comprising:
a magnetic emulator.

15. The device of claim 1, further comprising:
an EMV chip.

16. The device of claim 1, further comprising:
an RFID antenna.

17. The device of claim 1, further comprising:
an EMV chip.

18. The device of claim 1, wherein said display is a bi-stable display.

19. The device of claim 1, wherein said display is a non bi-stable display.

20. The device of claim 1, wherein said display is an electrochromic display.

* * * * *